United States Patent
Ovenshire et al.

(10) Patent No.: US 9,168,894 B2
(45) Date of Patent: Oct. 27, 2015

(54) METHODS AND SYSTEMS FOR CLOSURE NOTIFICATION

(71) Applicant: GM GLOBAL TECHNOLOGY OPERATIONS LLC, Detroit, MI (US)

(72) Inventors: Jay H. Ovenshire, Rochester, MI (US); John D. Blanchard, II, Farmington Hills, MI (US); Thomas W. Jozwiak, Southgate, MI (US); Altaf S. Imam, Troy, MI (US); Carl B. Corman, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 14/092,337

(22) Filed: Nov. 27, 2013

(65) Prior Publication Data
US 2015/0145658 A1    May 28, 2015

(51) Int. Cl.
*B60R 25/10* (2013.01)
(52) U.S. Cl.
CPC ..................................... *B60R 25/10* (2013.01)
(58) Field of Classification Search
None
See application file for complete search history.

(56) References Cited

U.S. PATENT DOCUMENTS

| | | | | |
|---|---|---|---|---|
| 4,426,691 A * | 1/1984 | Kawasaki | ........................ | 369/21 |
| 4,839,749 A * | 6/1989 | Franklin | ......................... | 360/12 |
| 8,669,860 B1 * | 3/2014 | Tinsley, II | ..................... | 340/521 |
| 2010/0057308 A1 * | 3/2010 | Hill | ................ | 701/51 |
| 2013/0135088 A1 * | 5/2013 | Simha | ......................... | 340/425.5 |
| 2015/0156567 A1 * | 6/2015 | Oliver et al. | .................. | 340/425 |

\* cited by examiner

*Primary Examiner* — Travis Hunnings
(74) *Attorney, Agent, or Firm* — Ingrassia Fisher & Lorenz, P.C.

(57) ABSTRACT

Apparatus are provided for notifying a driver of an open vehicle access. The apparatus includes an electronic control module for informing a vehicle driver that a vehicle access is not secured, the electronic control module configured to determine if a transmission of the vehicle is in either a park status or a neutral status, determine if all keys for the vehicle are located outside a predetermined distance from the vehicle and determine if a displacement sensor indicates that a vehicle access is not closed. When the vehicle is in the park or neutral status, the key is located at a distance greater than the predetermined distance from the vehicle, and at least one vehicle access is indicated as being not closed, then an access open message is generated and sent to the driver.

16 Claims, 2 Drawing Sheets

METHODS AND SYSTEMS FOR CLOSURE NOTIFICATION

TECHNICAL FIELD

The technical field generally relates to vehicle information systems, and more particularly relates to systems and methods to notify a vehicle driver that an access way into his vehicle is open.

BACKGROUND

Despite the exponentially growing amount of electronics finding their way into vehicles, drivers may tend to forget things. One aspect often forgotten by drivers is to secure their vehicle when they depart the vehicle. In certain instances, drivers may have left a door open, a window open, a convertible top down, or a trunk open. Even a hood may be left unlatched. This is undesirable when the vehicle is in a location where there is an expectation of precipitation.

Accordingly, it is desirable to inform a driver on his personal communication device when he has departed his vehicle having left an access way open or unlocked. This is particularly useful in the detection of an unauthorized movement of the vehicle. In addition, it is desirable to inform the driver that there is precipitation occurring while certain access ways into the vehicle are open. Furthermore, other desirable features and characteristics of the present invention will become apparent from the subsequent detailed description and the appended claims, taken in conjunction with the accompanying drawings and the foregoing technical field and background.

SUMMARY

An apparatus is provided for notifying a driver of an open vehicle access way. In one embodiment, the apparatus includes an electronic control module for informing a vehicle driver that a vehicle access is not secured, the electronic control module being configured to determine if a transmission of the vehicle is in either a park status or a neutral status, determine if all keys for the vehicle are located outside a predetermined distance from the vehicle (or are undetected) and determine if a displacement sensor indicates that a vehicle access is not closed. When the transmission of the vehicle is in park or the neutral, the key is located at a distance greater than the predetermined distance from the vehicle, and at least one vehicle access is indicated as being not closed, then an access open message is generated and sent to the driver.

A vehicle is also provided for. In one embodiment, the vehicle includes a body, a transmission, a wheel coupled to the body, an access way into the body, a displacement sensor monitoring the access way, an ignition key, and an electronic control module (ECM) receiving an output from the displacement sensor and the ignition key. The ECM is configured to determine when the key is further from the vehicle than a predetermined maximum distance, and to determine that the displacement sensor indicates that the access way in not secured. When the key is further than the maximum predetermined distance and the access way is determined to be not secured, then a message is compiled and transmitted to a vehicle operator that the access way is open.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
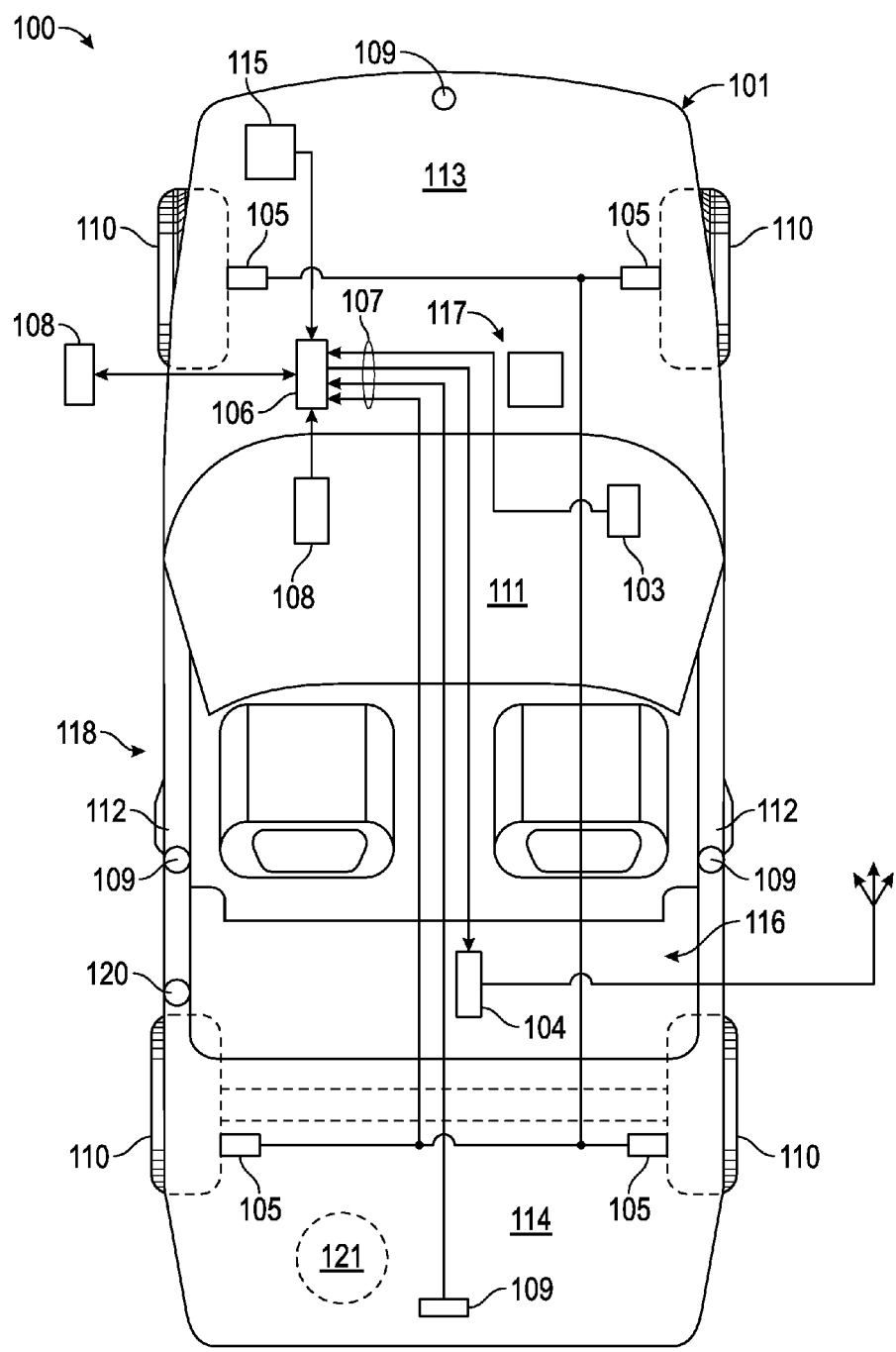
FIG. 1 is a simplified depiction of a vehicle including systems for detecting an open access way into a vehicle in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description, Those of skill in the art will appreciate that the various illustrative logical blocks, modules, circuits, and algorithm steps described in connection with the embodiments disclosed herein may be implemented as electronic hardware, computer software executing on a processor, or combinations of both. Some of the embodiments and implementations are described above in terms of functional and/or logical block components (or modules) and various processing steps. However, it should be appreciated that such block components (or modules) may be realized by any number of hardware, software executing on a processor, and/or firmware components configured to perform the specified functions.

To clearly illustrate this interchangeability, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may he interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

FIG. 1 is a simplified diagram of a vehicle 100 comprising various features disclosed herein. The vehicle comprises a body 101, four wheels 110, a windshield 111, a hood 113, a trunk 114, an electronic control module (ECM) 106, an ignition/ignition lock 122, and at least one door 112. The Vehicle also includes a roof 116 that may be an immobile roof or a retractable/removable roof.

The ECM 106 is a computing device that controls at least some of the functions of the vehicle 100. Various ECM's are well known in the art and will not be described further herein in the interest of brevity and clarity.

The vehicle 100 further comprises a communications/electrical bus 107, a battery 115 connected to the electrical bus, one or more wheel rotation sensors 105, a precipitation sensor 103, a transmission 117 and at least one displacement/position sensor 109. The electrical/communications bus 107 is in electronic communications with the battery 115, the rotation sensors 105, the precipitation sensor 103, the at least one displacement/position sensor 109 and the ECM 106.

The vehicle 100 is associated with a key 108 or a key fob, depending on the type of ignition/ignition lock 122. For the purpose of disclosure herein, it is unimportant as to whether a key is actually used to start the vehicle or whether its near proximity is required. Unless otherwise described, a "key" as used herein is defined as a conventional metal ignition key or an electronic proximity key fob. In either case the "key" contains electronics (e.g., a transponder) suitable for use in determining the distance of the key from the vehicle as is known in the art or that may be developed in the future. Systems for determining a distance of an electronic device from vehicle are well known in the art and will not be discussed further herein in the interest of clarity and brevity. A vehicle may have more than one key.

The vehicle 100 includes a communication system 104 that comprises a transceiver and antenna. The communication system 104 may use any communication protocol known in the art. Non-limiting examples of a wireless protocol include a simple radio frequency, a cellular telephone protocol, an IEEE 802.11 protocol and an IEEE 802.15 protocol system or a combination thereof.

Each of the precipitation sensor 103, the rotation sensor(s) 105 and the displacement/position sensor(s) 109 detect a condition of the vehicle 100 and transmits an electrical signal representing that condition to the ECM 106. The precipitation sensor 103 may be any precipitation sensor known in the art or that may be developed in the future and may be located anywhere on the vehicle, including but not limited to, on or inside the windshield 111.

The rotation sensor(s) 105 may be any rotation sensor(s) known in the art or that may be developed in the future that is configured to detect the rotation of the wheel(s) 110. The rotation sensor(s) 105 may be a passive sensor(s) that generates its own power when the wheel 110 moves or may be a powered sensor receiving power from battery 115. Each wheel may have its own sensor. Non-limiting examples of a rotational sensor 105 include a tire pressure monitor and wheel speed sensors, which may be any or all of optical, magnetic, acceleration or angular displacement sensors as known in the art.

The position sensor(s) 109 may be any position or displacement sensor known in the art or that may be developed in the future. The displacement/position sensors 109 are located as required by their principal of operation to monitor the open/closed status of an access way into the body the vehicle including, but not limited to, the trunk bonnet 114, the hood 113 and the gas tank cap 120. The displacement/position sensor(s) 109 may be a passive sensor that generates its own power when the sensor moves or may be a powered sensor receiving power from battery 115. Non-limiting examples of the displacement or position sensor 109 includes a convertible top actuators, a hall effect sensors, micro switches, plungers, an side door ajar switches.

In general, the ECM 106 receives input from the precipitation sensor(s) 103, the rotational sensor(s) 105 and the displacement/position sensor(s) 109 comprising electronic signals generated by those sensors indicating the presence of precipitation, the rotation of a wheel 110, and the open/shut closed status of the access way to the vehicle 100. Upon receiving the appropriate signals from the sensors (e.g., 103, 105, 109), the ECM 106 compiles a message to the driver to inform him that his vehicle is not secure and details the discrepancy. Not only does this notification mitigate poor memory, but it also useful for indicating a possible theft or unexpected movement of the vehicle. Once compiled, the message is sent to the driver's electronic device or other personal communication device by a cellular or by a local wireless network. The message may be voice, text or e-mail. Compiling and transmitting a message via voice, text and e-mail to a specific communications device are means of communication that are well known in the art and will not be discussed further herein in the interest of brevity and clarity.

Figure 2:
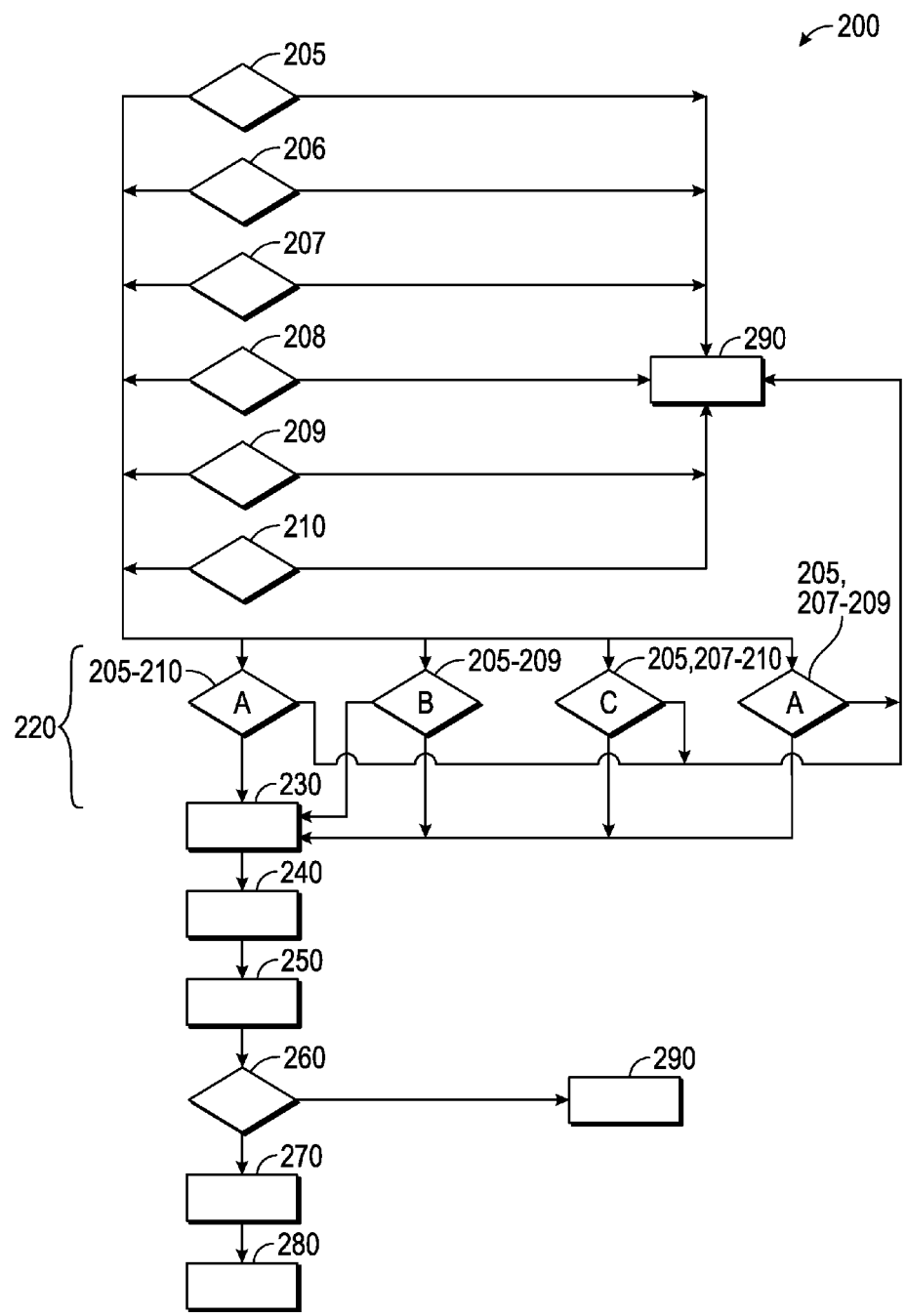
FIG. 2 is method for detecting an open access into the vehicle and sending notification thereof to the driver.

FIG. 2 is an exemplary logic flow diagram of a method 200 for detecting and communicating the open/closed status of a vehicle access way to a driver. It should be understood that that the steps of the following exemplary method may be rearranged in any order, steps may be combined and steps may be divided into multiple steps without departing from the scope and spirit of this disclosure.

As a prerequisite process 205, the battery 115 must be providing electric power to the ECM 106, the communication system 104, and the sensors 105, 109 and 103, if power is required by the sensor. If there is no power, no message is created at process 290. All sensors 105, 109 and 103 are continually monitoring their respective components.

At process 206, it is determined by conventional means whether the ignition key 108 is in or out of the ignition lock 122. If the key is not removed it is an indication that the driver is in the vehicle. Thus no message is compiled at process 290. Only in those cases where the vehicle 100 is not equipped an ignition key is this process optional.

At process 207, it is determined by conventional means whether a transmission 117 is in one of a Park or Neutral status. Contrarily, if the vehicle 100 is in a drive status or a reverse status, that implies the driver is in the vehicle. Thus, no message is compiled at process 290.

At process 208, it is determined whether the ignition key 108 is further from the vehicle than the predefined distance or is not detected at all. When the ignition key 108 is determined to be within the predetermined distance of the vehicle, this is an indication that the driver is at or in the vehicle. Hence, no message is compiled at process 290. A non-limiting example of the predetermined distance is approximately 10 feet from a periphery of the vehicle 100. However, the pre-determined distance may he any reasonable distance as may suffice to satisfy a particular need.

At process 209, it is determined if any of the displacement/position sensors 109 indicate whether any of the vehicle accesses ways are open. When no vehicle access ways are open, ajar or unlatched, then no message is compiled at process 290. A "vehicle access way" is any of but not limited to, a gas cap 120, a door 112, a window 118, a trunk bonnet 114, a hood 113 (open but latched or simply open), a sun roof, a retractable roof 116 and a spare tire compartment/securing device 121.

At process 210, it is determined if the precipitation sensor 103 indicates whether it is precipitating (e.g. raining). The driver may program the ECM 106 to send a message to the driver's personal communication device if it is precipitating. This may be the case when the driver has left his convertible roof 116 down, sun roof 116 open or window 118 open, and he only cares to receive a message when it begins to precipitate. In this case, when a vehicle access way is open, but it is not precipitating, then no message is compiled at process 290. Means for programming a computing device or an ECU 106 is well known in the art and will not be discussed further here in in the interest of brevity and clarity. As a non-limiting example the ECU 106 may be programmed by setting flags in a graphical user interface.

At process 220, a Boolean logic process takes place based on the conditions determined at processes (205-210). As non-limiting examples, Table 1 illustrates several combinations of determinations that may take place, depending on how the ECM 106 is programmed:

TABLE 1

| Programming | 205 | 206 | 207 | 208 | 209 | 210 | Msg Compiled |
|---|---|---|---|---|---|---|---|
| A | Yes | Yes | Yes | Yes | Yes | Yes | Yes |
| B | Yes | Yes | Yes | Yes | Yes | No | Yes |
| C | Yes | No | Yes | Yes | Yes | Yes | Yes |
| D | Yes | No | Yes | Yes | Yes | Yes | Yes |

With any of the exemplary programming combinations (A-D), all of the conditions as shown in each programing row must be true. In other words, all of the conditions in each row are "AND" together. Further, each row represents alternative conditions under which a message to the driver is compiled at process 230. In other words, each row is related by a conditional OR.

At process 240, the compiled message indicating that an identified vehicle access way is open is forwarded to communication system 104 for transmission to the driver. The message may be a voice, text or e-mail message or combination thereof. Thus, the transceiver to be used may be a cellular transceiver, a wireless transceiver (E.g., IEEE 802.11b, IEEE 802.15) or a satellite transceiver as determined at process 250.

At process 260, a determination is made from sensor input that the vehicle 100 is in motion or not. For example, such indication is received from any one or combination of sensors, such as one or more rotation sensors 105 and/or a conventional transmission sensor that indicates a transmission status. Process 260 may act as an optional theft warning feature that notifies the driver that his car is being moved while the key is located greater than the maximum distance from the vehicle as discussed at process 208. Thus, when a wheel rotation is determined, a wake up code is sent to ECU 106 at process 270.

In some vehicles, the battery 115 is providing current to the ECM 106 and other peripherals even when the vehicle 100 is shut down. In order to preserve battery power, the ECM 106 may revert to a standby or sleep mode. A standby mode is entered to reduce parasitic current draw when immediate processing is not required. The processor remains in this mode until a wake-up input becomes asserted or a reset occurs. A "wake up code" as used here in refers to a signal that when generated by the ECM 106 in standby mode upon detecting certain inputs, restores the ECM 106 to full operation where the processor executes all normal operational software instructions, and draws more power from battery 115 in order to further process inputs and send messages via the communication system 104.

At process 280 a second notification message is sent to the driver informing him that the vehicle 100 is being moved. This notification may be in addition to a first notification of an open vehicle access and does not necessarily require that all of the indications from processes 205-210 to be present as discussed above in regard to Table 1. When the vehicle 100 is not moving, then no second or unauthorized movement indication message is compiled at process 290.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An electronic control module for informing a user that a vehicle access way of a vehicle is not secured, the electronic control module configured to:

determine if a transmission of the vehicle is in either a park status or a neutral status;

determine if all keys for the vehicle are located outside a predetermined distance from the vehicle;

determine if a displacement sensor indicates that a vehicle access is not closed;

when the vehicle is in a park status or neutral status, all keys are located at a distance greater than the predetermined distance from the vehicle and at least one vehicle access way is indicated as being not closed, then generate an access open message the user; and transmit the access open message to the user.

2. The electronic control module of claim 1, wherein the access open message is one of a text message, an e-mail message and a voice message delivered to a personal communication device of the user.

3. The electronic control module of claim 1, wherein the electronic control module is further configured to determine if all keys are out of an ignition lock, if so then no access open message is sent.

4. The electronic control module of claim 1, wherein the electronic control module is further configured to determine whether there is precipitation, and when the is no precipitation no access open message is sent.

5. The electronic control module of claim 1, wherein the electronic control module is further configured to determine if a wheel of the vehicle is rotating.

6. The electronic control module of claim 5, wherein when the wheel is rotating and all keys are outside the predetermined distance from the vehicle, then compile a theft notification message for the user.

7. The electronic control module of claim 6, wherein when the wheel is determined to be rotating and all keys are outside the predetermined distance from the vehicle, then generate a wake up code.

8. The electronic control module of claim 6, wherein the theft notification message is one of a text message, an e-mail message and a voice message delivered to a personal communication device of the.

9. A vehicle comprising:
a body;
a transmission within the body;
a wheel coupled to the transmission;
an access way into the body;
a displacement sensor monitoring the access way;
an ignition key; and
an electronic control module (ECM) that receives an output from each of the displacement sensor and the ignition key, the ECM being configured to:
determine when the ignition key is further from the vehicle than a predetermined maximum distance, and
determine when the displacement sensor indicates that the access way is not closed,
wherein when the ignition key is further than a maximum pre-determined distance and the access way is determined to be not closed, then compile and transmit a message to a vehicle user that the access way is open.

10. The vehicle of claim 9, wherein the ignition key is a wireless key fob.

11. The vehicle of claim 9, wherein the access way is one or more of a door, a window, convertible roof, a moveable roof segment, a hood, a trunk and a gas tank cover.

12. The vehicle of claim 9, further comprising:
an ignition key lock;
a precipitation sensor;
a rotation sensor configured to detect the rotation of the wheel; and
a transmission sensor configured to detect a drive state of the transmission.

13. The vehicle of claim 9, wherein when the precipitation sensor does not detect precipitation, then the message is not compiled.

14. The vehicle of claim 9, wherein when the transmission sensor detects that the transmission is in a drive status, then the message is not compiled.

15. The vehicle of claim 13, wherein when the ignition key is not in the ignition key lock, then the message is not compiled.

16. The vehicle of claim 13, wherein when the ignition key is located a distance from the vehicle greater than the predetermined distance and the rotation sensor detects rotation of the wheel, then compiling an anti-theft message to the vehicle driver.

* * * * *